(12) United States Patent
Jasinski et al.

(10) Patent No.: US 12,554,872 B2
(45) Date of Patent: Feb. 17, 2026

(54) SYSTEM AND METHOD FOR NOTIFYING USERS ABOUT PUBLICLY AVAILABLE DATA

(71) Applicant: MOTOROLA SOLUTIONS, INC., Chicago, IL (US)

(72) Inventors: Krzysztof Jasinski, Cracow (PL); Pawel Stys, Cracow (PL); Lukasz Osuch, Psczyna (PL); Przemyslaw Krzystanek, Cracow (PL); Pawel Wilkosz, Wisniowa (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 286 days.

(21) Appl. No.: 18/040,206

(22) PCT Filed: Nov. 24, 2020

(86) PCT No.: PCT/PL2020/050088
§ 371 (c)(1),
(2) Date: Feb. 1, 2023

(87) PCT Pub. No.: WO2022/114974
PCT Pub. Date: Jun. 2, 2022

(65) Prior Publication Data
US 2023/0289461 A1     Sep. 14, 2023

(51) Int. Cl.
*G06F 21/62*     (2013.01)
*G06Q 50/26*     (2024.01)
(52) U.S. Cl.
CPC ....... *G06F 21/6218* (2013.01); *G06Q 50/265* (2013.01)
(58) Field of Classification Search
CPC .. G06F 21/62; G06F 21/6209; G06F 21/6218; G06F 21/6272; G06Q 50/265
See application file for complete search history.

(56) References Cited

U.S. PATENT DOCUMENTS 7,565,683 B1 * 7/2009 Huang ................ G06F 21/6209
726/1
8,413,261 B2    4/2013 Nemoy et al.
(Continued)

FOREIGN PATENT DOCUMENTS

CN     110290002 A     9/2019
EP       2550765 B1     1/2019
(Continued)

OTHER PUBLICATIONS

The International Search Report and the Written Opinion, corresponding application No. PCT/PL2020/050088 filed: Nov. 24, 2020, all pages.

*Primary Examiner* — Jeremy S Duffield
(74) *Attorney, Agent, or Firm* — Raguraman Kumaresan

(57) ABSTRACT

A process of notifying users about publicly available data. In operation, an authorization server receives a request from a user to access a data item. The authorization server then determines a restriction status assigned to the data item. When the restriction status indicates that the data item is not publicly available for access, the authorization server identifies access rights associated with the user to the data item. If access rights indicate that the user does not have access to the data item, the authorization server denies user access to the data item, and responsively monitors for a reclassification of the restriction status assigned to the data item. The authorization server transmits a notification to the user indicating that the data item is publicly available for access by the user in response to detecting a reclassification of the restriction status indicating that the data item is publicly available.

17 Claims, 4 Drawing Sheets

(56) References Cited

U.S. PATENT DOCUMENTS

| | | |
|---|---|---|
| 8,793,489 B2 | 7/2014 | Polunin |
| 9,497,279 B2 | 11/2016 | Trossen et al. |
| 9,519,799 B2 | 12/2016 | Asim et al. |
| 9,692,765 B2 | 6/2017 | Choi et al. |
| 2006/0013233 A1 | 1/2006 | Trossen et al. |
| 2007/0118872 A1* | 5/2007 | Song ............... H04N 21/434 725/135 |
| 2007/0209080 A1 | 9/2007 | Ture et al. |
| 2009/0055365 A1* | 2/2009 | Ager ................. G06F 21/552 |
| 2009/0077658 A1* | 3/2009 | King ................ G06Q 30/0601 726/21 |
| 2009/0112868 A1* | 4/2009 | Rajamani ......... G06F 16/9535 707/999.009 |
| 2009/0112869 A1* | 4/2009 | Duquene ............ G06F 21/62 707/999.009 |
| 2009/0129591 A1* | 5/2009 | Hayes ............... G06F 21/608 380/51 |
| 2013/0067595 A1* | 3/2013 | Pierre ............... G06F 21/6218 726/28 |
| 2014/0215568 A1* | 7/2014 | Kirigin ............. G06F 21/6218 726/4 |
| 2017/0109535 A1* | 4/2017 | Kozakura .......... H04L 63/302 |
| 2019/0251281 A1 | 8/2019 | Freedman et al. |
| 2019/0253419 A1* | 8/2019 | De Wever ............ H04L 63/10 |
| 2019/0325070 A1* | 10/2019 | Kovács ............ G06F 16/248 |
| 2019/0377894 A1* | 12/2019 | Jang ................ G06F 21/6218 |
| 2020/0387321 A1* | 12/2020 | Bansal .............. G06F 3/0673 |
| 2020/0389505 A1* | 12/2020 | Bailey .............. H04W 4/00 |

FOREIGN PATENT DOCUMENTS

| | | |
|---|---|---|
| EP | 3069466 B1 | 12/2019 |
| KR | 20110078519 A | 7/2011 |
| KR | 20150043150 A | 4/2015 |

\* cited by examiner

SYSTEM AND METHOD FOR NOTIFYING USERS ABOUT PUBLICLY AVAILABLE DATA

BACKGROUND

Controlling access to data is often necessary to restrict access to confidential or sensitive data only to certain people in an organization. Typically, access to data is secured by maintaining a list of users who have been granted access to the data and further by identifying a type of access granted to each user in the list. While the list may be updated to include new users or to modify the type of access granted to existing users in the list, current systems do not provide monitoring or notification services for users who have been denied access to the data.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
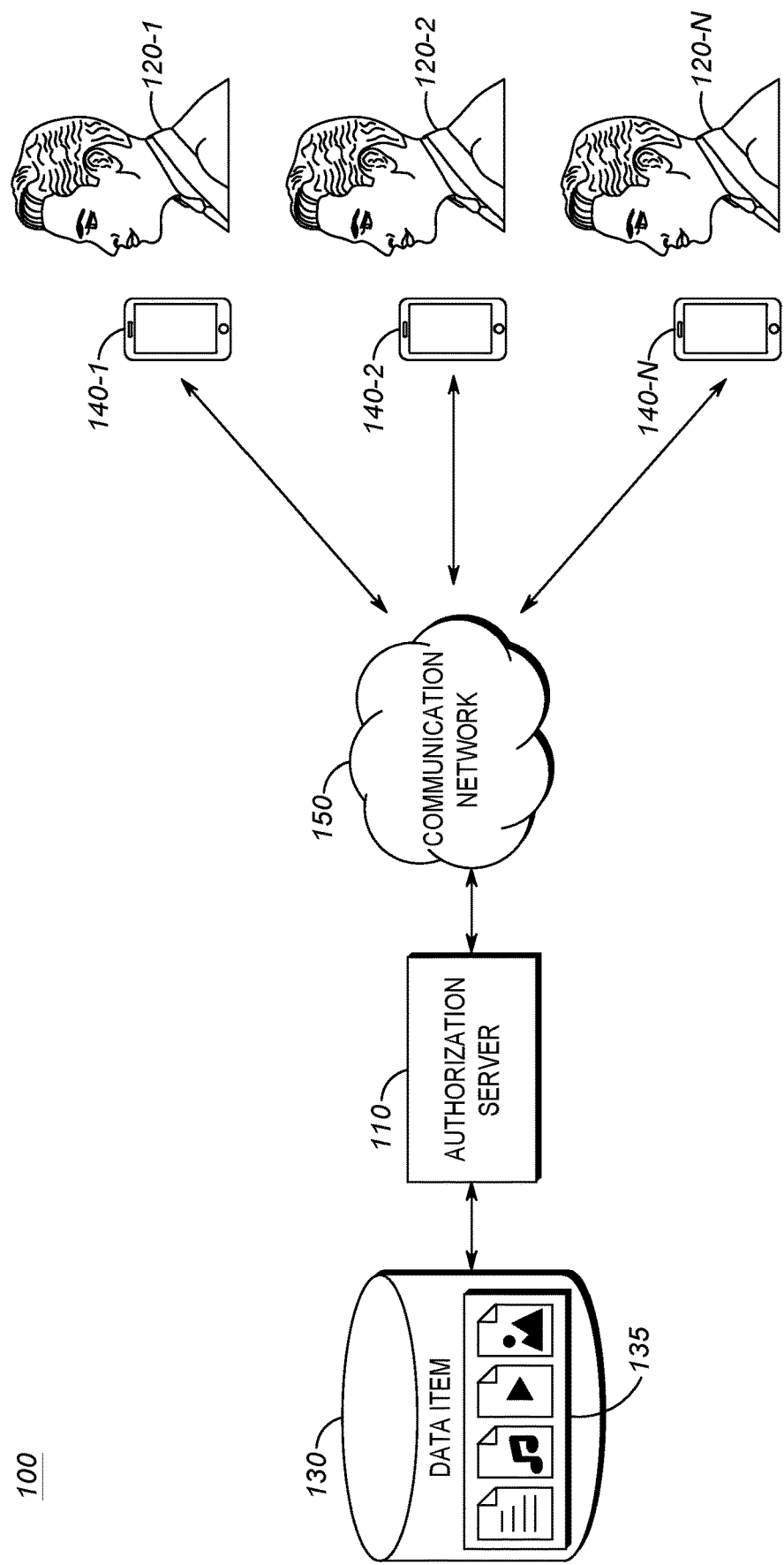
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

When a user requests access to restricted data i.e., data classified as confidential or sensitive, a server controlling access to the data may deny access to the user unless the user has already been granted access to the data. It is possible that at some point after the access has been denied to the user, the data which was previously classified as confidential or sensitive may be reclassified as publicly available data, for example, as a result of the data being leaked in the public (e.g., published on an internet site) or due to a decision by the data owner (or by a governmental entity controlling public access to the data) to make the data publicly available. Existing systems do not provide data-reclassification monitoring and notification services for users who have been denied access to data. It would be beneficial for enterprises and public safety agencies to monitor reclassification of data and automatically notify such users who have been previously denied access to the data when the data is reclassified as publicly available data. Disclosed is an improved system and method that automatically monitors reclassification of restricted status of data and notifies users about publicly available data in response to the reclassification of the restriction status.

One embodiment provides a method of notifying users about publicly available data. The method comprises: receiving, at an authorization server, a request to access a data item, the request identifying a user requiring access to the data item; determining, at the authorization server, a restriction status assigned to the data item, the restriction status indicating whether the data item is publicly available for access; identifying, at the authorization server, access rights associated with the user to the data item when the restriction status indicates that the data item is not publicly available for access; determining, at the authorization server, whether the user has access to the data item based on the access rights associated with the user; denying, at the authorization server, access of the user to the data item when the user does not have access to the data item, and responsively monitoring for a reclassification of the restriction status assigned to the data item on behalf of the user; and detecting, at the authorization server, a reclassification of the restriction status indicating that the data item is publicly available, and responsively transmitting a notification to the user, the notification indicating that the data item is publicly available for access by the user.

Another embodiment provides an authorization server comprising a transceiver and an electronic processor communicatively coupled to the transceiver. The electronic processor is configured to: receive, via the transceiver, a request to access a data item, the request identifying a user requiring access to the data item; determine a restriction status assigned to the data item, the restriction status indicating whether the data item is publicly available for access; identify access rights associated with the user to the data item when the restriction status indicates that the data item is not publicly available for access; determine whether the user has access to the data item based on the access rights associated with the user; deny access of the user to the data item when the user does not have access to the data item, and responsively monitoring for a reclassification of the restriction status assigned to the data item on behalf of the user; and detect reclassification of the restriction status indicating that the data item is publicly available, and responsively transmitting, via the transceiver, a notification to the user, the notification indicating that the data item is publicly available for access by the user.

Yet another embodiment provides a multi-tenant communication system including a plurality of cloud tenants, a common database shared by the plurality of cloud tenants, and an authorization server communicatively coupled to the plurality of tenants. The authorization server configured to: receive a request to access a data item, the request identifying one of the cloud tenants requiring access to the data item stored in the common database by another one of the cloud tenants; determine a restriction status assigned to the data item, the restriction status indicating whether the data item is publicly available for access; identify access rights associated with the one of the cloud tenants to the data item when the restriction status indicates that the data item is not publicly available for access; determine whether the one of the cloud tenants has access to the data item based on the access rights associated with the one of the cloud tenants; deny access of the one of the cloud tenants to the data item when the one of the cloud tenants does not have access to the data item, and responsively monitoring for a reclassification of restriction status assigned to the data item on behalf of the one of the cloud tenants; and detect a reclassification of the restriction status assigned to the data item, the reclassification of the restriction status indicating that the data item is publicly available, and responsively transmit a notification to the one of the cloud tenants indicating that the data item is publicly available for access by the one of the cloud tenants.

Each of the above-mentioned embodiments will be discussed in more detail below, starting with example system and device architectures of the system in which the embodiments may be practiced, followed by an illustration of processing blocks for achieving an improved technical method, device, and system for notifying users about publicly available data. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including an authorization server 110 configured to provide data-reclassification monitoring and notification services for users 120 who have been denied access to a data item 135 stored in a database 130. In accordance with some embodiments, the authorization server 110 controls access to the data items 135 stored in the database 130. The communication system 100 further includes communication devices 140-1, 140-2, . . . 140-N each of which may be respectively operated by users 120-1, 120-2, . . . 120-N to transmit a request to the authorization server 110 to access a data item 135 stored in the database 130. The plurality of users 120-1 through 120-N can be interchangeably referred to, collectively, as users 120, and generically as a user 120. Similarly, the plurality of communication devices 140-1 through 140-N can be interchangeably referred to, collectively, as communication devices 140, and generically as a communication device 140. The communication devices 140 may be a mobile phone, laptop, tablet, desktop computer, smart watch or another computing device that is configured to communicate with the authorization server 110. In accordance with some embodiments, web browsers or applications installed on the communication devices 140 provide user interfaces to enable users 120 to request access to data items 135 stored in the database 130.

Each communication device 140 may include one or more wired or wireless communication interfaces for communicating with the authorization server 110 via a communication network 150. The communication network 150 includes wireless and wired connections. For example, the communication network 150 may be implemented using a wide area network, such as the Internet, a local area network, such as a Wi-Fi network, and personal area or near-field networks, for example a Bluetooth™ network. Portions of the communications network 150 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

In accordance with some embodiments, the communication devices 140 may correspond to devices operated by users 120 associated with one or more public safety agencies. In these embodiments, the data items 135 stored in the database 130 may take the form of digital evidence (e.g., text, audio, image, or video files) that are captured corresponding to a public safety incident (e.g., a fire incident, robbery, vehicle collision, etc.). Each data item 135 included in the database 130 may be linked to a unique incident identifier (e.g., a computer aided dispatch (CAD) identifier) assigned to a particular incident corresponding to which the data item 135 (e.g., digital evidence) was captured. For example, the data item 135 may represent a video evidence captured by a body-worn camera operated by a police officer. In some of these embodiments, a physical storage resource (e.g., storage server) at which the database 130 resides may be shared among multiple tenants of a cloud system. Each tenant may represent a group of users 120 associated with a separate public safety agency. In these embodiments, while the physical storage resource is shared among multiple tenants, the authorization server 110 may control access of tenants to the data items 135 stored in the database 130 to ensure only tenants authorized to access particular data items are able to access the data items 135. For example, a data item 135 (e.g., video evidence captured at an incident scene) stored in the database 130 may be owned by a public safety agency such as a police department. Another public safety agency such as a fire department may not have access rights to access the data item 135 owned by the police department. In this case, the authorization server 110 may deny users in the fire department access to video evidence stored in the database 130 by the police department.

Figure 2:
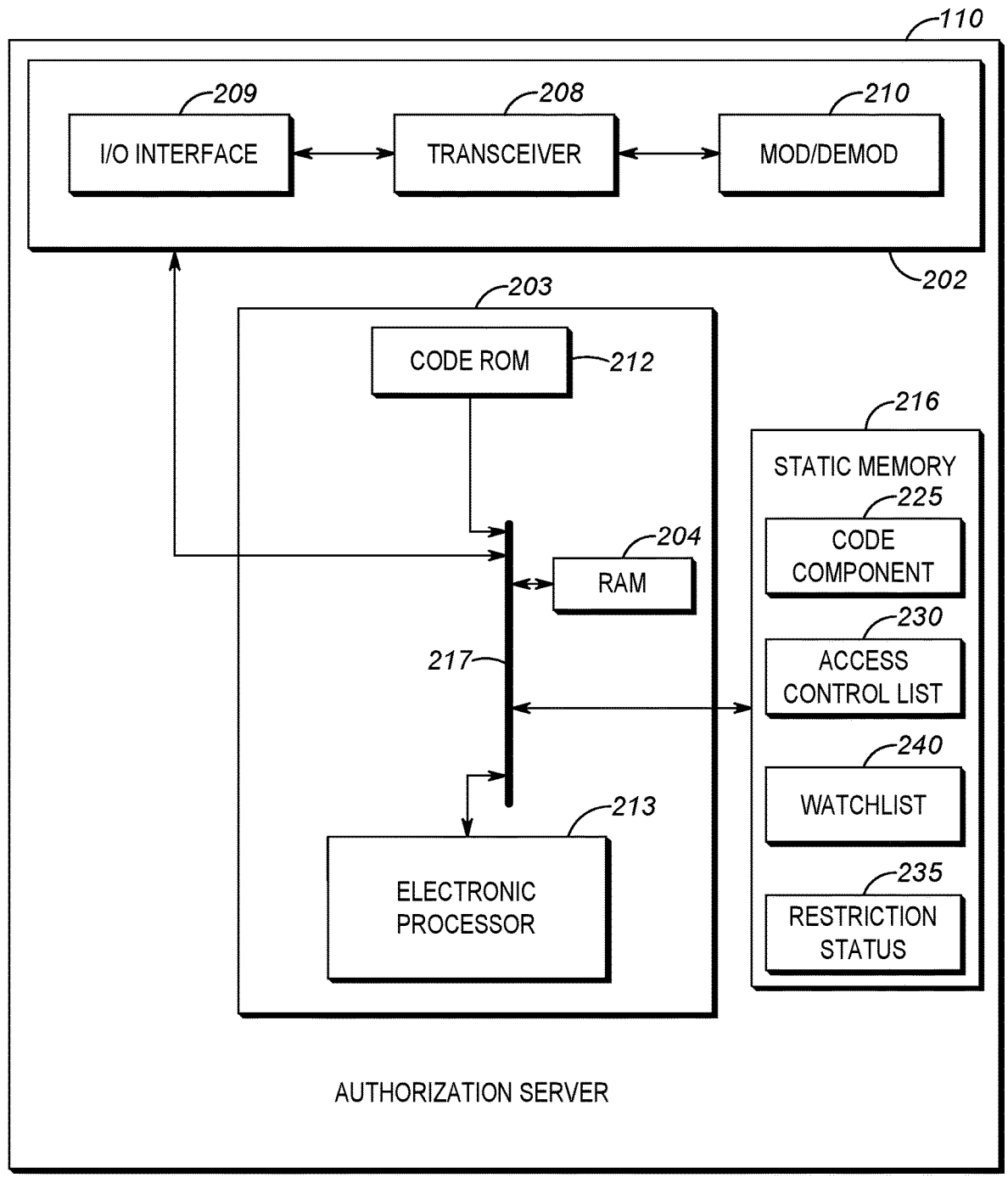
FIG. 2 is a block diagram of an authorization server shown in FIG. 1 in accordance with some embodiments.

FIG. 2 is an example functional block diagram of an authorization server 110 operating within the communication system 100 in accordance with some embodiments. The authorization server 110 may be embodied in computing devices not illustrated in FIG. 1, and/or may be a distributed computing device across two or more of the foregoing (or multiple of a same type of one of the foregoing) and linked via a wired and/or wireless communication link(s). While FIG. 2 represents an authorization server 110 described above with respect to FIG. 1, depending on the type of authorization server 110, the authorization server 110 may include fewer or additional components in configurations different from that illustrated in FIG. 2.

As shown in FIG. 2, the authorization server 110 includes a communications unit 202 coupled to a common data and address bus 217 of a processing unit 203. The communications unit 202 sends and receives data to and from other network entities (e.g., communication devices 140 and database 130) in the system 100. The communications unit 202 may include one or more wired and/or wireless input/output (I/O) interfaces 209 that are configurable to communicate, for example, with communication devices 140 in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202, such as for receipt by the communication devices 140.

Figure 3:
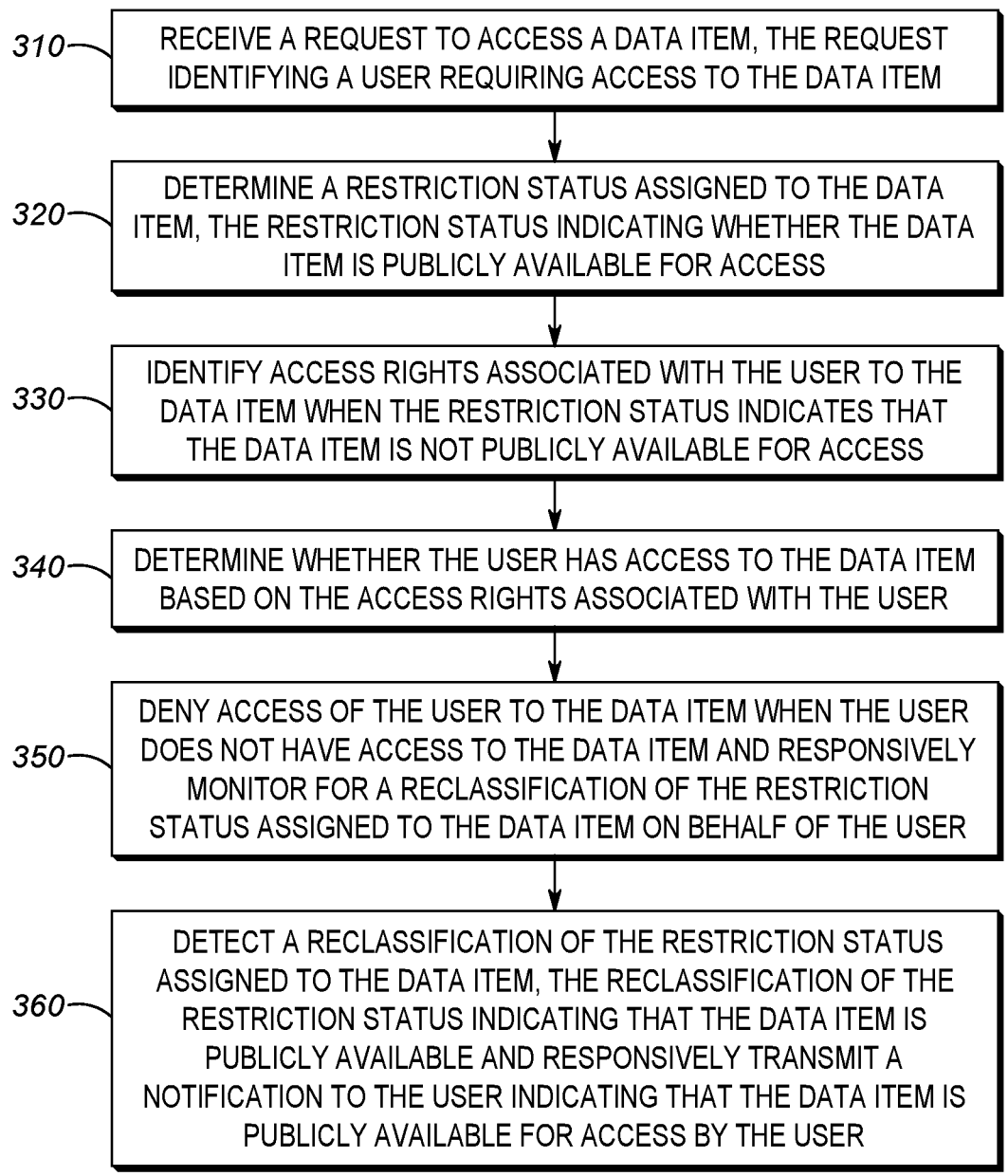
FIG. 3 illustrates a flowchart of a process of notifying users about publicly available data in accordance with some embodiments.
Figure 4:
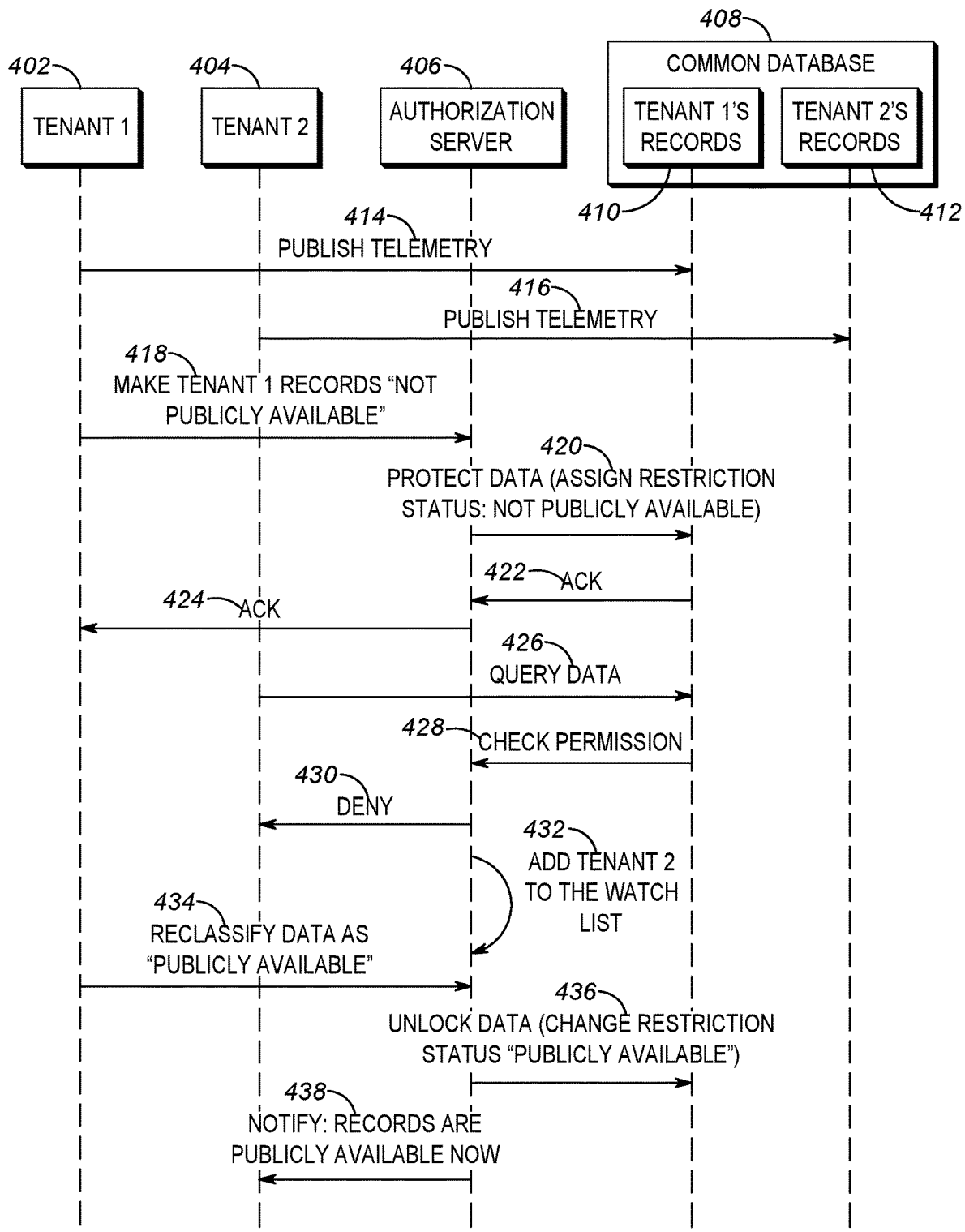
FIG. 4 shows a message flow diagram illustrating a multi-tenant communication system in which the process of notifying users about publicly available data can be implemented in accordance with some embodiments.

Static memory 216 may store operating code 225 for the electronic processor 213 that, when executed, performs one or more of the blocks set forth in FIGS. 3 and 4 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In accordance with embodiments, the authorization server 110 has access to or otherwise stores, at the static memory 216, access control list 230 that is used to control access to data items 135 stored in the database 130. The authorization server 110 maintains a separate access control list 230 for each data item 135 stored in the database 130 for which access is controlled by the authorization server 110. The access control list 230 associated with a particular data item includes a list of users 120 who have been granted access to the particular data item 135. For example, the access control list 230 may identify each user 120 who has been granted access to the data item 135 using a user identifier or address associated with the user 120. The user identifier or address includes, but is not limited to, an email address, a phone number, an employee number, a device identifier of a communication device 140 operated by the user 120, or any other user identifier or address that uniquely identifies the user 120. The access control list 230 associated with a particular data item 135 further identifies, for each user 120 included in the list 230, a permission level indicating whether the user 120 is permitted to perform one or more types of user operations (e.g., read, write, or execute operation) on the data item 135.

The authorization server 110 further has access to or otherwise maintains at the static memory 216 a restriction status 235 assigned to each data item 135 indicating whether the data item 135 is publicly available for access or not. In one embodiment, the restriction status 235 may be represented as a binary value, for example, '0' to indicate that the data item 135 is not publicly available for access and '1' to indicate that the data item 135 is publicly available. The restriction status 235 may be represented in other forms as well. In accordance with embodiments, the restriction status 235 assigned to a data item 135 is tracked separately from the access control list 230. In other words, the restriction status 235 assigned to a particular data item independently tracks whether a particular data item 135 is publicly available for access, for example, as a result of the data item 135 being made available on a public network (e.g., internet). In accordance with embodiments, the authorization server 110 periodically or in response to a request from another server searches the public network for publicly accessible data items that contain same or similar content as the data item 135 being searched. If the authorization server 110 finds one or more data items in the public network with the same or similar content as the data item 135 being searched, the authorization server 110 may reclassify the restriction status 235 assigned to the data item 135 to indicate that the data item 135 is publicly available for access. In accordance with some embodiments, the authorization server 110 does not make any changes to the access control list 230 associated with the data item 135 based on the reclassification of the restriction status 235. In other words, in these embodiments, the access control list 230 remains unchanged even when the restriction status 235 is reclassified and access to the data item 135 stored in the database 130 is still controlled based on the status of access control list 230 as maintained prior to the reclassification to the restriction status 235. The authorization server 110 may also reclassify the restriction status 235 assigned to the data item 135 when the authorization server 110 receives a request from the data owner (e.g., a public safety agency or enterprise) or another entity responsible for controlling the public access to the data item 135 to reclassify the restriction status 235 to indicate that the data item 135 is publicly available for access.

The authorization server 110 further has access to or otherwise maintains at the static memory 216 a watchlist 240 that identifies a list of users 120 as having been denied access to a particular data item 135. The authorization server 110 maintains a separate watchlist 240 for each data item 135 stored in the database 130 for which access is controlled by the authorization server 110. In accordance with embodiments, when the authorization server 110 receives a request to access a data item 135 from a user 120, it either grants or denies access of the user 120 to the data item 135. In accordance with embodiments, the authorization server 110 first checks the restriction status 235 assigned to the data item 135. If the restriction status 235 indicates that the data item 135 is not publicly available for access, then the authorization server 110 determines further whether the user 120 has access to the data item 135 based on the access rights associated with the user 120. The authorization server 110 determines the access rights associated with the user 120 by processing the access control list 230 associated with the data item 135 being requested by the user 120. When user's 120 identifier is not included in the access control list 230 assigned to the data item 135, the authorization server 110 determines that the user 120 does not have access to the data item 135 and in response the authorization server 110 denies access of the user 120 to the requested data item 135. In response to denying access to the data item 135, the authorization server 110 updates the watchlist 240 to identify the user 120 (e.g., by including a corresponding user identifier in the watchlist 240) among the list of users 120 as having been denied access to the particular data item 135. In accordance with some embodiments, the authorization server 110 activates data-reclassification monitoring and notification services for all users 120 added to the watchlist 240 associated with a particular data item 135. The authorization server 110 performs the data-reclassification monitoring and notification services by monitoring for a reclassification of the restriction status 235 assigned to the data item 135 on behalf of each user 120 identified in the watchlist 240. When the authorization server 110 detects a reclassification of the restriction status 235 assigned to the data item 135 as a result of the data item 135 being publicly available, the authorization server 110 automatically transmits a notification to all users 120 included in the watchlist 240. The notification may be transmitted to the user 120 based on the user identifier included in the watchlist 240. For example, the notification may be transmitted as a text or voice message to an email address, a phone number, or directly to a communication device 140 identified as being operated by the user 120. The notification may also include a data resource identifier (e.g., a uniform resource locator (URL) address) identifying an alternative data source (i.e., a data source different from the database 130) from which a data item with content similar to the data item 135 (i.e., data item 135 stored in the database 130 to which access was previously denied) can be accessed.

Turning now to FIG. 3, a flowchart diagram illustrates a process 300 of notifying users about publicly available data. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An authorization server 110 shown in FIG. 1 and/or FIG. 2, and embodied as a singular computing device or distributed computing device may execute process 300 via an electronic processor 213 implemented at the authorization server 110. The authorization server 110 may execute the process 300 at power-on, at some predetermined periodic time period thereafter, in response to a trigger raised locally at the authorization server 110 via an internal process or via an input interface or in response to a trigger from an external device to which the authorization server 110 is communicably coupled, among other possibilities.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

Process begins at block 310 when the authorization server 110 receives a request to access a data item 135 stored in the database 130. The request identifies the data item as well as a user 120 requiring access to the data item 135. For example, the request may include user identifiers of one or more users 120 requiring access to the data item 135. In addition, the request may also identify a type of user operation (read, write, or execute operation) that the user intends to perform on the data item 135. The user 120 may interact with a web browser or a feature application installed on a communication device 140 to select a data item 135 stored in the database 130 and to request access to the selected data item 135. In response, the communication device 140 may transmit a request identifying the data item 135 being requested as well as a user identifier that uniquely identifies the user 120 requesting the data item 135. In accordance with some embodiments, when the authorization server 110 receives a request at block 310 to access multiple data items 135 stored in the database, the authorization server 110 executes the functions described at blocks 320 through 360 separately for each data item 135 identified in the request.

At block 320, when the authorization server 110 receives the request to access the data item 135, the authorization server 110 determines a restriction status 235 assigned to the data item 135. The restriction status 235 indicates whether the data item 135 is publicly available for access. If a restriction status 235 is not yet assigned to the data item 135, the authorization server 110 may first perform a search of the data item 135 on a public network (e.g., internet). For example, the authorization server 110 parses the requested data item 135 to extract a text, audio, image, or video portion that uniquely represents the data item 135. The authorization server 110 then searches the public network for one or more publicly accessible data items including the extracted text, audio, image, or video portion that uniquely represents the data item 135. When one or more publicly accessible data items including the extracted text, audio, image, or video portion are retrieved from the public network during the search, the authorization server 110 assigns a restrictions status 235 to the data item 135 indicating that the data item 135 is publicly available for access. In one embodiment, when the restriction status 235 assigned to the data item 135 indicates that the data item 135 is publicly available for access, the authorization server 110 skips the execution of process blocks 320-360 and instead directly proceeds to grant access of the user 120 to the requested data item 135 irrespective of access rights associated with the user.

When the restriction status 235 assigned to the data item 135 is not publicly available for access, the authorization server 110 proceeds to block 330 to identify access rights associated with the user 120 to the data item 135. In accordance with embodiments, the access rights of a user 120 are identified based on (i) whether a user identifier (as included in the request received at block 310) of the user 120 is included in an access control list 230 associated with the requested data item 135 and (ii) whether a permission level of the user 120 with respect to the data item 135 as identified in the access control list 230 matches with a type of user operation (as included in the request received at block 310) that the user 120 intends to perform on the data item 135.

At block 340, the authorization server 110 determines whether the user 120 has access to the data item 135 based on the access rights associated with the user 120. In accordance with some embodiments, the authorization server 110 determines that the user 120 has access to the data item 135 when access rights associated with the user 120 indicates that (i) the user identifier associated with the user 120 is included in the access control list 230 associated with the data item 135 and (ii) the permission level of the user 120 with respect to the data item 135 as identified in the access control list 230 matches with the type of user operation that the user 120 intends to perform on the data item 135. In this case, when the authorization server 110 determines that the user 120 has access to the data item 135, the authorization server 110 proceeds to grant access to the user 120 to the data item 135. For example, the authorization server 110 may transmit a notification to the user indicating that the user 120 has access to the requested data item 135. The authorization server 110 further allows the user 120 to perform the intended user operation on the data item 135. On the other hand, the authorization server 110 may determine that the user 120 does not have access to the data item 135 when access rights associated with the user indicates that (i) the user identifier associated with the user 120 is not included in the access control list 230 associated with the data item 135 or (ii) the user identifier associated with the user 120 is included in the access control list 230 associated with the data item 135, but the permission level of the user 120 with respect to the data item 135 as identified in the access control list 230 does not match with a type of user operation that the user intends to perform on the data item 135.

At block 350, when the authorization server 110 determines that the user 120 does not have access to the data item 135, the authorization server 110 denies access of the user 120 to the data item 135, and further responsively monitors for a reclassification of the restriction status 235 assigned to the data item 135 on behalf of the user 120. The authorization server 110 may transmit a notification to the user 120 indicating that the user 120 does not have access to the requested data item 135. In accordance with some embodiments, the notification denying access to the user 120 further includes information indicating that a data-reclassification monitoring and notification service with respect to the requested data item 135 has been automatically activated for the user 120. In one embodiment, the notification denying access to the user 120 may prompt the user 120 to either accept or decline the data-reclassification monitoring and notification service being activated for the user 120. If the user 120 accepts the service being activated, the authorization server 110 automatically updates a watchlist 240 associated with the data item 135 to identify the user 120 as having been denied access to the data item 135 and to further indicate that data-reclassification monitoring and notification service has been activated for the user 120. On the other hand, if the user 120 declines the service being activated, the authorization server 110 refrains from identifying the user 120 in the watchlist 240. In this case, when the user 120 is not identified in the watchlist 240, the authorization server 110 does not activate data-reclassification monitoring and notification service for the user 120 and therefore does not provide notification to the user 120 when the authorization server 110 detects that that restriction status 235 assigned to the data item 135 has been reclassified to indicate that the data item 135 is publicly available for access.

If the watchlist 240 associated with the data item 135 identifies multiple users 120, then the authorization server 110 monitors for a reclassification of the restriction status 235 assigned to the data item 135 on behalf of all the users 120 identified in the watchlist 240. In one embodiment, the authorization server 110 monitors for a reclassification of the restriction status 235 assigned to the data item 135 on behalf of the users 120 identified in the watchlist 240 by (i) parsing the data item 135 to extract a text, audio, image, or video portion that uniquely represents the data item 135 and (ii) searching a public network for one or more publicly accessible data items including the extracted text, audio, image, or video portion that uniquely represents the data item 135. For example, the authorization server 110 may parse a video evidence using object classifiers and further extract one or more features (e.g., a facial feature, tattoo, birthmark, vehicle type/make, color or pattern of an object etc.) or a combination of features associated with an object of interest (e.g., person, vehicle etc.) found within the video evidence. The authorization server 110 may then search the public network for any publicly available video that resembles the extracted features associated with the object of interest. In addition, the authorization server 110 may also use metadata (e.g., a location, a date, or a time of the video evidence) to search for publicly available video containing metadata and features extracted from the video evidence stored in the database 130.

When the authorization server 110 finds publicly accessible data items resembling the original data item 135 stored in the database, the authorization server 110 reclassifies the restriction status 235 assigned to the data item 135 to indicate that the data item 135 is publicly available. For example, the restriction status 235 may be reclassified to indicate that the data item 135 is publicly available when one or more publicly accessible data items retrieved from the public network during the search includes the text, audio, image, or video portion extracted from the original data item 135 stored in the database 130. As another example, restriction status 235 may be reclassified to indicate that the data item is publicly available when the data item 135 representing a digital evidence linked to an incident identifier is cleared for unrestricted access by an authorized governmental entity (e.g., a court of law).

At block 360, when the authorization server 110 detects a reclassification of the restriction status 235 indicating that the data item 135 is publicly available, the authorization server 110 responsively transmits a notification to the user 120 indicating that the data item 135 is publicly available for access by the user 120. The notification may be transmitted to the user 120 based on the user identifier included in the watchlist 240. For example, the notification may be transmitted as a text or voice message to an email address, a phone number, or directly to a communication device 140 associated with the user 120. The notification may also include a data resource identifier (e.g., a URL address) identifying an alternative data source (i.e., a data source different from the database 130) from which a data item with content similar to the data item 135 (i.e., data item 135 stored in the database 130 to which access was previously denied) can be accessed. In accordance with embodiments, the authorization server 110 transmits a similar notification to other users 120 identified in the watchlist 240 associated with the same data item 135 in response to detecting a reclassification of the restriction status 235 indicating that the data item 135 is publicly available.

In one embodiment, when the data item 135 includes multiple data portions (e.g., a video evidence with multiple clips), the authorization server 110 may determine, during the monitoring, that a first portion of data item 135 is publicly available and a second portion of the data item 135 is not publicly available. In this embodiment, the restriction status 235 may be reclassified to indicate that the data item is partially publicly available. In this case, when the authorization server 110 detects the reclassification of restriction status 235 assigned to the data item 135, the authorization server 110 further determines whether the user 120 has access to the second portion of the data item 135 based on the access rights associated with the user 120. When it is determined that the user 120 has access to the second portion of the data item 135 based on the access rights associated with the user 120, the authorization server 110 transmits a notification to the user 120 indicating that the first data portion is publicly available for access by the user 120 and the second data portion is available for access by the user 120 based on the access rights associated with the user 120. In this case, the notification transmitted to the user 120 indicates to the user 120 that the user 120 has been granted access to the second portion of the data item 135 stored in the database 130. In addition, the notification to the user 120 may also include a link (e.g., URL address) identifying an alternative data source (i.e., a data source different from the database 130) from which a data item with content similar to the first portion of the data item 135 (i.e., data item 135 stored in the database 130 to which access was previously denied) can be accessed by the user 120. On the other hand, when it is determined that the user 120 does not have access to the second portion of the data item 135 based on the access rights associated with the user 120, the authorization server 110 transmits a notification indicating that the data item 135 is partially publicly available. In this case, the notification to the user 120 may provide an indication denying access of the second portion of the data item 135 stored in the database 130. The notification may also include a data resource identifier (e.g., a URL address) identifying an alternative data source (i.e., a data source different from the database 130) from which a data item with content similar to the first portion of the data item 135 (i.e., data item 135 stored in the database 130 to which access was previously denied) can be accessed by the user 120.

FIG. 4 shows a message flow diagram illustrating a multi-tenant communication system 400 in which the method of FIG. 3 can be implemented in accordance with some embodiments. The multi-tenant communication system 400 includes a plurality of cloud tenants, for example, tenant 402 and tenant 404 sharing a common database 408 (also referred to as a multi-tenant cloud database). The multi-tenant communication system 400 further includes an authorization server 406 (which is similar to authorization server 110 shown in FIGS. 1 and 2). The authorization server 406 is configured to control access to records stored in the common database 408. Some records stored in the common database 408 may be publicly available for access by all tenants sharing the common database 408, but access to other records stored in the common database 408 may be restricted. Tenants 402, 404 periodically capture telemetry data regarding communication infrastructure deployed in their respective communication systems and further push the telemetry data for storage at the common database 408. As shown in FIG. 4, tenant 402 publishes 414 its telemetry data in its records 410 stored at the common database 408. Similarly, tenant 404 publishes 416 its telemetry data in its records 412 stored at the common database 408. As an example, telemetry data of tenant 402 may include information related to failures in system components (e.g., central processing unit (CPU), memory etc.), or particular devices (e.g., portable radios assigned to users) associated with communication infrastructure deployed for tenant 402. Tenant 402 may not want to share telemetry data representing failure of system components or devices with other tenants (e.g., tenant 404) sharing the common database 408. Accordingly, tenant 402 may assign a restriction status 235 to its telemetry data stored in the common database 408 to ensure that other tenants (e.g., tenant 404) cannot access its telemetry data.

As shown in FIG. 4, tenant 402 transmits an instruction 418 to the authorization server to make its records 410 "not publicly available." In response, the authorization server 406 protects the telemetry data published by tenant 402 by assigning a restriction status 235 to tenant's 402 records 410 to indicate that the telemetry data is not publicly available. In accordance with some embodiments, the authorization server 406 may transmit an instruction 420 to a cloud computing resource (not shown) at which the common database 408 resides to protect the tenant's 402 records 410 by assigning a restriction status 235 to indicate that the telemetry data contained in the records 410 is not publicly available. In response, the authorization server 406 receives 422 an acknowledgment indicating that tenant's 402 records 410 is protected at the common database 408. The authorization server 406 then forwards 424 the acknowledgment to tenant 402.

In this example, tenant 404 may be interested to access tenant's 402 telemetry data records 410 stored in the common database 408. For example, tenant 404 may use tenant's 402 telemetry data to generate a machine learning model to detect and avoid similar failures with respect to system components or devices associated with a communication infrastructure deployed for tenant 404 operation. As shown in FIG. 4, tenant 404 transmits 426 a query to the authorization server 406 requesting access to tenant's 402 telemetry data. The query requesting access to tenant 402's telemetry data may identify a specific data item (e.g., telemetry data) stored in tenant's 402 records 410 as well as the identity of the tenant (i.e., tenant 404, which may be associated with multiple users) requiring access to the data item. In addition, the query may also include a type of user operation (read, write, or execute operation) that the tenant 404 intends to perform on the telemetry data of tenant 402.

Upon receiving the query from tenant 404, the authorization server 406 first checks the restriction status 235 assigned to the requested telemetry data contained within tenant's 402 records 410. Since tenant 402's records 410 have a restriction status 235 that indicates that it is not publicly available, the authorization server 406 further checks 428 whether the tenant 404 has access rights and permission level to access the telemetry data contained within tenant's 402 records 410. In this example, the authorization server 406 detects that the tenant 404 does not have access to the requested telemetry data and/or does not have permission to perform a requested user operation on the requested telemetry data. The authorization server 406 denies 430 access of the tenant 404 to the requested telemetry data contained within the tenant's 402 records 410. The authorization server 406 may transmit a notification to the tenant 404 indicating that the tenant 404 does not have access to the requested telemetry data. The authorization server 406 further automatically activates data-reclassification monitoring and notification service for tenant 404 by adding 432 the identity of tenant 404 to a watchlist 240 associated with the requested telemetry data contained within tenant's 402 records 410. The authorization server 406 then monitors for a reclassification of the restriction status 235 assigned to the requested telemetry data.

When system component failures or device failures associated with the communication infrastructure of tenant 402 are rectified, tenant 402 may decide to reclassify the restriction status 235 of telemetry data contained within the records 410 to indicate that the telemetry data is publicly available. In this case, tenant 402 may transmit 434 a notification to the authorization server 406 to reclassify the telemetry data as "publicly available." In response, the authorization server 406 may transmit 436 an instruction, for example, to the common database 408 to unlock tenant's 402 records 410 stored in the common database 408. When the restriction status 235 assigned to tenant's 402 records 410 stored in the common database 408 is reclassified as "publicly available," the authorization server 406 transmits 438 a notification to tenant 404 to indicate that tenant's 402 telemetry data requested by tenant 404 is now publicly available. Tenant 404 can then access Tenant's 402 telemetry data for use in generating a machine learning model to detect and avoid similar failures with respect to system components or devices associated with tenant 404.

Embodiments of the present disclosure may be implemented for use in reclassifying incident data obtained by public safety agencies. As an example, different kinds of users (e.g., private citizens, journalists, public safety officers from other agencies etc.), may be interested to access a video footage captured by an officer's body-worn camera at an incident scene. However, a public safety agency may refuse to share the video footage in accordance with their data sharing policy. For example, the public safety agency video may restrict the video footage for public access while the investigation of an incident is under progress. In accordance with embodiments of the present disclosure, a data reclassification and monitoring service may be automatically activated for such users after they have been denied access to the video footage. Meanwhile, a private citizen might have captured a video footage of the same incident and further uploaded it on a publicly accessible video sharing service. In this case, the public safety agency responsible for controlling access of the video footage captured by the officer's body-worn camera may determine that the private citizen's video footage may lead to misinformation in public because it does not show the whole context of the incident. In response, the public safety agency may make a decision to reclassify the restriction status assigned to the agency's video footage to indicate that it is publicly available. In accordance with embodiments of the present disclosure, this reclassification of the restriction status assigned to the agency's video footage automatically causes a notification to be sent to all or a subset of users who have been previously denied access to the agency's video footage. In some cases, notification may also be automatically sent to other users (e.g., local newspaper and television media networks) who have not specifically requested the agency's video footage.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of notifying users about publicly available data, the method comprising:
   receiving, at an authorization server, a request to access a data item, the request identifying a user requiring access to the data item;
   determining, at the authorization server, a restriction status assigned to the data item, the restriction status indicating whether the data item is publicly available for access, wherein the restriction status is tracked separately from an access control list associated with the data item;
   identifying, at the authorization server, access rights associated with the user to the data item when the restriction status indicates that the data item is not publicly available for access;
   determining, at the authorization server, whether the user has access to the data item based on the access rights associated with the user;
   denying, at the authorization server, access of the user to the data item when the user does not have access to the data item, and responsively monitoring for a reclassification of the restriction status assigned to the data item from not publicly available to publicly available on behalf of the user; and
   detecting, at the authorization server, a reclassification of the restriction status indicating that the data item is publicly available, and responsively transmitting a notification to the user, the notification indicating that the data item is publicly available for access by the user,
   wherein the data item has a first data portion and a second data portion, the method further comprising:
   determining, based on monitoring, that the first data portion of the data item is publicly available and the second data portion of the data item is not publicly available;
   reclassifying the restriction status to indicate that the data item is partially publicly available; and
   in response to detecting the reclassification of the restriction status, determining whether the user has access to the second data portion of the data item based on the access rights associated with the user,
   wherein transmitting the notification comprises:
   when it is determined that the user has access to the second data portion of the data item based on the access rights associated with the user, transmitting the notification indicating that the first data portion is publicly available for access by the user and the second data portion is available for access by the user based on the access rights associated with the user.

2. The method of claim 1, further comprising:
   maintaining a watchlist that identifies a list of users as having been denied access to the data item; and
   monitoring for reclassification of the restriction status from not publicly available to publicly available on behalf of the list of users identified in the watchlist.

3. The method of claim 2, further comprising updating the watchlist to identify the user among the list of users as having been denied access to the data item in response to determining that the user does not have access to the data item.

4. The method of claim 3, wherein in response to detecting the reclassification of the restriction status assigned to the data item, the method comprising:
providing a notification indicating that the data item is publicly available to all the users identified in the watchlist.

5. The method of claim 1, wherein monitoring for a reclassification of the restriction status assigned to the data item on behalf of the user, comprises:
parsing the data item to extract a text, audio, image, or video portion that uniquely represents the data item; and
searching a public network for one or more publicly accessible data items including the extracted text, audio, image, or video portion that uniquely represents the data item.

6. The method of claim 5, further comprising:
reclassifying the restriction status assigned to the data item to indicate that the data item is publicly available when the one or more publicly accessible data items including the extracted text, audio, image, or video portion are retrieved from the public network.

7. The method of claim 1, wherein transmitting the notification comprises:
when it is determined that the user does not have access to the second data portion of the data item based on the access rights associated with the user, transmitting the notification indicating the data item is partially publicly available.

8. The method of claim 1, wherein the data item is a digital evidence linked to an incident identifier, the method further comprising:
reclassifying the restriction status assigned to the data item to indicate that the digital evidence is publicly available when the digital evidence linked to the incident identifier is cleared for unrestricted access by an authorized governmental entity.

9. The method of claim 1, wherein the data item is stored in a multi-tenant cloud database shared by a plurality of cloud tenants including a first cloud tenant from which the data item is obtained for storage in the multi-tenant cloud database and a second cloud tenant restricted from accessing the data item, the method further comprising:
receiving a request to access the data item from the second cloud tenant;
denying access of the data item to the second cloud tenant in response to determining that the second cloud tenant does not have access to the data item, and responsively monitoring for a reclassification of the restriction status assigned to the data item on behalf of the second cloud tenant; and
detecting a reclassification of the restriction status assigned to the data item, the reclassification of the restriction status indicating that the data item is publicly available, and responsively transmitting a notification to the second cloud tenant, the notification indicating that the data item is publicly available for access by the second cloud tenant.

10. The method of claim 9, wherein the first cloud tenant is associated with a first public safety agency and the second cloud tenant is associated with a second public safety agency.

11. An authorization server, comprising:
a transceiver; and
an electronic processor communicatively coupled to the transceiver, wherein the electronic processor is configured to:
receive, via the transceiver, a request to access a data item, the request identifying a user requiring access to the data item;
determine a restriction status assigned to the data item, the restriction status indicating whether the data item is publicly available for access, wherein the restriction status is tracked separately from an access control list associated with the data item;
identify access rights associated with the user to the data item when the restriction status indicates that the data item is not publicly available for access;
determine whether the user has access to the data item based on the access rights associated with the user;
deny access of the user to the data item when the user does not have access to the data item, and responsively monitoring for a reclassification of the restriction status assigned to the data item from not publicly available to publicly available on behalf of the user; and
detect reclassification of the restriction status indicating that the data item is publicly available, and responsively transmitting transmit, via the transceiver, a notification to the user, the notification indicating that the data item is publicly available for access by the user,
wherein the data item has a first data portion and a second data portion, the electronic processor is further configured to:
determine, based on monitoring, that the first data portion of the data item is publicly available and the second data portion of the data item is not publicly available reclassify the restriction status to indicate that the data item is partially publicly available; and in response to detecting the reclassification of the restriction status,
determine whether the user has access to the second data portion of the data item based on the access rights associated with the user and when it is determined that the user has access to the second data portion of the data item based on the access rights associated with the user, transmit the notification indicating that the first data portion is publicly available for access by the user and the second data portion is available for access by the user based on the access rights associated with the user.

12. The authorization server of claim 11, further comprising:
a memory for storing a watchlist that identifies a list of users as having been denied access to the data item, wherein the electronic processor is configured to:
monitor for reclassification of the restriction status from not publicly available to publicly available on behalf of the list of users identified in the watchlist; and
update the watchlist to identify the user among the list of users as having been denied access to the data item when it determines that the user does not have access to the data item.

13. The authorization server of claim 11, wherein the electronic processor is configured to:
parse the data item to extract a text, audio, image, or video portion that uniquely represents the data item;
search a public network for one or more publicly accessible data items including the extracted text, audio, image, or video portion that uniquely represents the data item; and
reclassify the restriction status assigned to the data item to indicate that the data item is publicly available when the one or more publicly accessible data items including the extracted text, audio, image, or video portion are retrieved from the public network.

14. The authorization server of claim 11, wherein the data item is a digital evidence linked to an incident identifier, the electronic processor is configured to:

reclassify the restriction status assigned to the data item to indicate that the digital evidence is publicly available when the digital evidence linked to the incident identifier is cleared for unrestricted access by an authorized governmental entity.

15. The authorization server of claim 11, wherein the data item is stored in a multi-tenant cloud database shared by a plurality of cloud tenants including a first cloud tenant from which the data item is obtained for storage in the multi-tenant cloud database and a second cloud tenant restricted from accessing the data item, the electronic processor is further configured to:

receive a request to access the data item from the second cloud tenant;

deny access of the data item to the second cloud tenant in response to determining that the second cloud tenant does not have access to the data item, and responsively monitor for a reclassification of the restriction status assigned to the data item on behalf of the second cloud tenant; and detect a reclassification of the restriction status assigned to the data item, the reclassification of the restriction status indicating that the data item is publicly available, and responsively transmit, via the transceiver, a notification to the second cloud tenant, the notification indicating that the data item is publicly available for access by the second cloud tenant.

16. The authorization server of claim 15, wherein the first cloud tenant is associated with a first public safety agency and the second cloud tenant is associated with a second public safety agency.

17. A multi-tenant communication system, comprising:

a plurality of cloud tenants;

a common database shared by the plurality of cloud tenants; and an authorization server communicatively coupled to the plurality of cloud tenants, the authorization server configured to:

receive a request to access a data item, the request identifying one of the cloud tenants requiring access to the data item stored in the common database by another one of the cloud tenants;

determine a restriction status assigned to the data item, the restriction status indicating whether the data item is publicly available for access, wherein the restriction status is tracked separately from an access control list associated with the data item;

identify access rights associated with the one of the cloud tenants to the data item when the restriction status indicates that the data item is not publicly available for access;

determine whether the one of the cloud tenants has access to the data item based on the access rights associated with the one of the cloud tenants;

deny access of the one of the cloud tenants to the data item when the one of the cloud tenants does not have access to the data item, and responsively monitoring for a reclassification of restriction status assigned to the data item from not publicly available to publicly available on behalf of the one of the cloud tenants; and detect a reclassification of the restriction status assigned to the data item, the reclassification of the restriction status indicating that the data item is publicly available, and responsively transmit a notification to the one of the cloud tenants indicating that the data item is publicly available for access by the one of the cloud tenants, wherein the data item has a first data portion and a second data portion, the authorization server is further configured to:

determine, based on monitoring, that the first data portion of the data item is publicly available and the second data portion of the data item is not publicly available;

reclassify the restriction status to indicate that the data item is partially publicly available; and in response to detecting the reclassification of the restriction status, determine whether the one of the cloud tenants has access to the second data portion of the data item based on the access rights associated with the one of the cloud tenants; and when it is determined that the one of the cloud tenants has access to the second data portion of the data item based on the access rights associated with the one of the cloud tenants, transmit the notification indicating that the first data portion is publicly available for access by the one of the cloud tenants and the second data portion is available for access by the one of the cloud tenants based on the access rights associated with the one of the cloud tenants.

* * * * *